(12) United States Patent
Zu et al.

(10) Patent No.: US 12,418,475 B2
(45) Date of Patent: Sep. 16, 2025

(54) FAULT-TOLERANT ROUTING ALGORITHM FOR TOROIDAL NETWORK TOPOLOGIES

(71) Applicant: Google LLC, Mountain View, CA (US)

(72) Inventors: Yazhou Zu, Sunnyvale, CA (US); Brian Patrick Towles, Chapel Hill, NC (US); Alireza Ghaffarkhah, San Jose, CA (US)

(73) Assignee: Google LLC, Mountain View, CA (US)

( * ) Notice: Subject to any disclaimer, the term of this patent is extended or adjusted under 35 U.S.C. 154(b) by 390 days.

(21) Appl. No.: 18/077,906

(22) Filed: Dec. 8, 2022

(65) Prior Publication Data
US 2024/0195732 A1 Jun. 13, 2024

(51) Int. Cl.
H04L 45/28 (2022.01)
H04L 45/00 (2022.01)

(52) U.S. Cl.
CPC .............. *H04L 45/28* (2013.01); *H04L 45/54* (2013.01)

(58) Field of Classification Search
None
See application file for complete search history.

(56) References Cited

U.S. PATENT DOCUMENTS

| | | |
|---|---|---|
| 8,085,659 B2 | 12/2011 | Duato Marin et al. |
| 9,282,037 B2 | 3/2016 | Parker et al. |
| 9,590,914 B2 | 3/2017 | Atlar et al. |
| 10,153,985 B2 | 12/2018 | Kim et al. |
| 10,469,380 B2 | 11/2019 | Parker et al. |
| 11,075,892 B2 | 7/2021 | Venkataraman |
| 11,362,934 B2 | 6/2022 | Oprea et al. |
| 11,784,920 B2 | 10/2023 | Roweth et al. |
| 2005/0100035 A1* | 5/2005 | Chiou ............... H04L 45/24 370/389 |
| 2014/0185611 A1* | 7/2014 | Lie ..................... H04L 45/34 370/355 |
| 2014/0237156 A1* | 8/2014 | Regula ............ G06F 13/4022 710/314 |
| 2020/0112480 A1* | 4/2020 | Johnsen .............. H04L 49/25 |
| 2020/0322258 A1 | 10/2020 | Oprea et al. |
| 2020/0389404 A1 | 12/2020 | Wu et al. |
| 2023/0094933 A1 | 3/2023 | Towles |

(Continued)

FOREIGN PATENT DOCUMENTS

CN 1787478 A 6/2006

OTHER PUBLICATIONS

Priyanka N. Chopkar and Mahendra A. Gailwad, Ph.D., Review of XY Routing Algorithm for 2D Torus Topology of NoC Architecture, Recent Trends in Engineering Technology, 2013, 5 pages.

(Continued)

*Primary Examiner* — Xavier S Wong
(74) *Attorney, Agent, or Firm* — Lerner David LLP

(57) ABSTRACT

Generally disclosed herein is an approach for optimizing routing strategy to tolerate faults in a toroidal network topology including, but not limited to, N-dimensional mesh, torus, and twisted torus. The approach may include balancing a load for a specified input traffic pattern operating offline or online. The approach may also include an optimization enhancement technique specifically applicable to symmetric, dynamically composable toroidal networks based on a set of centrally connected circuit switches.

6 Claims, 13 Drawing Sheets

(56) References Cited

U.S. PATENT DOCUMENTS

2023/0261973 A1  8/2023  Jennings

OTHER PUBLICATIONS

Jens Domke, Torsten Hoefler, and Satoshi Matsuoka, Routing On The Dependency Graph: A New Approach To Deadlock-Free High Performance Routing, 2016, 12 pages.

Abdul Quaiyum Ansari, Mohammad Rashid Ansari and Mohammad Ayoub Khan, Modified Quadrant-Based Routing Algorithm for 3D Torus Network-on-Chip Architecture, Feb. 20, 2016, 4 pages.

Bjarne E. Helvik, and Ragnar Øivind Andreassen, Fault Tolerance in Optical Networks; A Study Of Electronic in-and Egress Interconnections in Torus Topologies, Jan. 2005, 13 pages.

International Search Report and Written Opinion for International Application No. PCT/US2023/020000 dated Aug. 17, 2023. 15 pages.

Yang et al. RDT Properties and Evaluations. Information Technology: New Generations, 2006. ITNG 2006. Third International Conference On Las Vegas, Nv, USA Apr. 10-12, 2006, IEEE, Piscataway, NJ, USA, Apr. 10, 2006 (Apr. 10, 2006), pp. 239-244.

Valiant. A Scheme for Fast Parallel Communication. Siam J. Comput. vol. 11, No. 2, May 1982. Society for Industrial and Applied Mathematics, 12 pages.

Singh et al. Locality-Preserving Randomized Oblivious Routing on Torus Networks. SPAA'02, Aug. 10-13, 2002, Winnipeg, Manitoba, Canada. 11 pages.

Ramanujam et al. Weighted Random Oblivious Routing on Torus Networks. Oct. 2009. ANCS '09: Proceedings of the 5th ACM/IEEE Symposium on Architectures for Networking and Communications Systems. 9 pages.

Extended European Search Report for European Patent Application No. 24212842.9 dated Apr. 22, 2025. 9 pages.

Flavell et al. Tokkyu: A High-Performance, Randomizing, Adaptive Message Router With Packet Expressway. IEICE Transactions on Information and Systems, Information & Systems Society, Tokyo, JP, vol. E78-D, No. 10, Oct. 1, 1995 (Oct. 1, 1995), pp. 1248-1260, XP000541670, ISSN: 0916-8532.

* cited by examiner

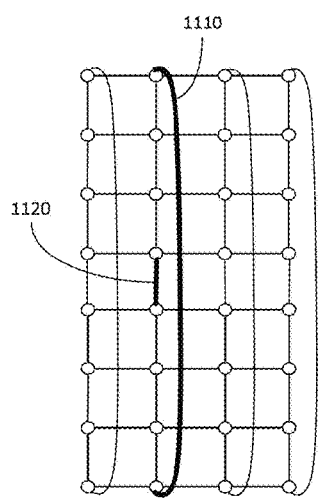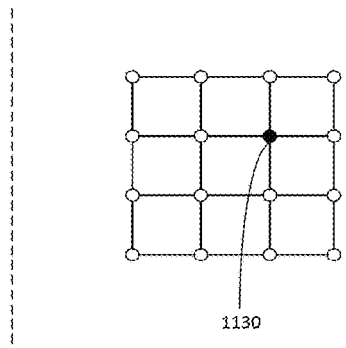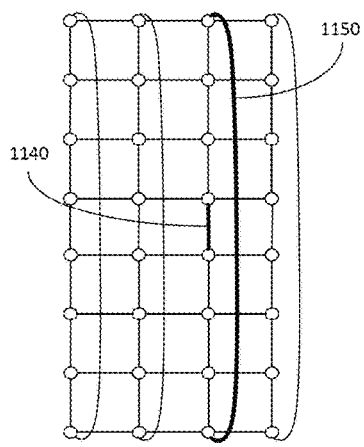
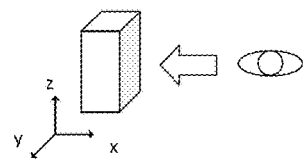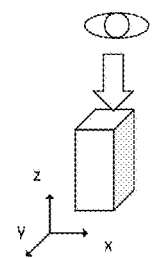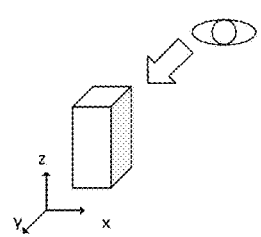
FIG.11A  FIG.11B  FIG.11C

FAULT-TOLERANT ROUTING ALGORITHM FOR TOROIDAL NETWORK TOPOLOGIES

BACKGROUND

A grid network topology is a network topology where each node of the network is connected with neighboring nodes along one or more dimensions. A toroidal network topology may include an N-dimensional grid network topology with circularly connected nodes. Toroidal network topologies for today's supercomputers, including N-dimensional mesh, torus, and twisted torus can contain sparse link failures. Thus, node-to-node reachability between any two nodes may not be guaranteed using conventional dimension-order routing techniques for the toroidal network topologies. Moreover, the conventional dimension order routing strategy may not address high load imbalance and traffic congestion at links near a circuit switch where the fault occurs if the supercomputer employs a set of centralized circuit switches to interconnect different subnets to form a larger network between racks and clusters.

BRIEF SUMMARY

Generally disclosed herein is an approach for routing around link faults in a toroidal network topology by finding fault-free routes between each pair of nodes in a toroidal network topology. In this regard, the fault-free routes may be determined by first arbitrarily selecting hops from either a source node or a destination node to another node. Each hop traverses a single link between two nodes. For each arbitrary hop selection, subsequent hops following a dimension order may be followed until the destination node or the source node, respectively, is reached. A route may be considered the combination of the arbitrary hop and the subsequent hops following the dimension order. In the event a route includes a faulty link, the route may be dropped from further consideration. By generating routes using arbitrary hops from either the source or destination node, multiple fault-free routes between a source node and destination node, or vice versa, can be generated thereby providing alternate routes to account for possibly faulty links. The generated routes may also be used to improve the load balancing of the links. In this regard, an optimization strategy may be used to select a fault-free route for each pair of nodes while balancing the loads on each link. In some instances, the optimization strategy may leverage the symmetry of toroidal network topologies to minimize the optimization processing time required to balance loads.

An aspect of the disclosure provides for a method for optimizing routing for a network. The method includes steps: (i) taking, by one or more processors, a first hop arbitrarily from a source node to a current node along any direction, the first hop establishing a candidate route; (ii) taking, by the one or more processors, a subsequent hop across a link from the current node to an additional node following a dimension order; (iii) assigning, by the one or more processors, the additional node as the current node and repeating steps (ii)-(iii) until the current node is a destination node; and (iv) taking, by the one or more processors, a new first hop from the source node along a new direction to establish a new candidate route and repeating steps (ii)-(iv) until candidate routes are established for all directions from the source node.

In another example, the method further includes steps: before step (iii), determining, by the one or more processors, if the link is a broken link; and abandoning the establishment of the candidate route upon determining the link is broken and performing step (iv).

In yet another example, the method further includes load-balancing each link within the network using integer linear programming.

In yet another example, the method further includes determining the load balance of each link using the following formula:

$$\gamma_C = \sum_{p \in c} x_p$$

wherein, $\gamma_C$ is the load on each link c, p is a candidate route, and x is a Boolean variable that determines whether the candidate route passing the link c is selected by the integer linear programming.

In yet another example, the method further includes minimizing a maximum load across all channels using the following optimization formula:

Minimize L, s·t $\gamma_C \leq L_{dim(c)}, \forall c$ $L_d \leq L, \forall d$ wherein L is the maximum load across all dimensions, $L_{dim(c)}$ is a maximum load across all link c on a dimension, and $L_d$ is a maximum load on dimension d.

In yet another example, the method further includes generating a routing table for the network based on a solution of the optimization formula.

In yet another example, the method further includes reducing a number of the channels by taking a multiplier between a fault pattern and a traffic pattern of the network Another aspect of the disclosure provides for a routing system of optimizing routing for a network including a network fabric, a plurality of circuit switches; and a plurality of compute nodes, each compute node comprising one or more processors and memory storing instructions that, when performed by the one or more processors, causes the one or more processors to perform operations, the operations comprising the steps: (i) taking, by one or more processors, a first hop arbitrarily from a source node to a current node along any direction, the first hop establishing a candidate route; (ii) taking, by the one or more processors, a subsequent hop across a link from the current node to an additional node following a dimension order; (iii) assigning, by the one or more processors, the additional node as the current node and repeating steps (ii)-(iii) until the current node is a destination node; and (iv) taking, by the one or more processors, a new first hop from the source node along a new direction to establish a new candidate route and repeating steps (ii)-(iv) until candidate routes are established for all directions from the source node.

In another example, the operation further includes steps: before step (iii), determining, by the one or more processors, if the link is a broken link; and abandoning the establishment of the candidate route upon determining the link is broken and performing step (iv).

In yet another example, the operation further includes load-balancing each link within the network using integer linear programming.

In yet another example, the operation further includes the method further includes minimizing a maximum load across all channels using the following optimization formula:

Minimize L,s·t $\gamma_C \leq L_{dim(c)}, \forall c$ $L_d \leq L, \forall d$ wherein L is the maximum load across all dimensions, $L_{dim\_(c)}$ is a maximum load across all link c on a dimension, and $L_d$ is a maximum load on dimension d.

In yet another example, the operation further includes generating a routing table for the network based on a solution of the optimization formula.

In yet another example, the operation further includes reducing a number of the channels by taking a multiplier between a fault pattern and a traffic pattern of the network The above and other aspects of the disclosure can include one or more of the following features. In some examples, aspects of the disclosure provide for all of the following features, in combination.

In an example, the network comprises a distributed cluster with a network fabric in toroidal topology shapes.

In yet another example, the network includes N-dimensions.

In yet another example, the first hop can be taken in N×2 directions.

BRIEF DESCRIPTION OF THE DRAWINGS

FIGS. 11A and 11B illustrate example planar views of a 4×4×8 torus when a circuit switch is down in z dimension according to aspects of the disclosure.

FIG. 11C illustrates an example perspective view of a 4×4×8 torus when a circuit switch is down in z dimension according to aspects of the disclosure.

DETAILED DESCRIPTION

Figure 1:
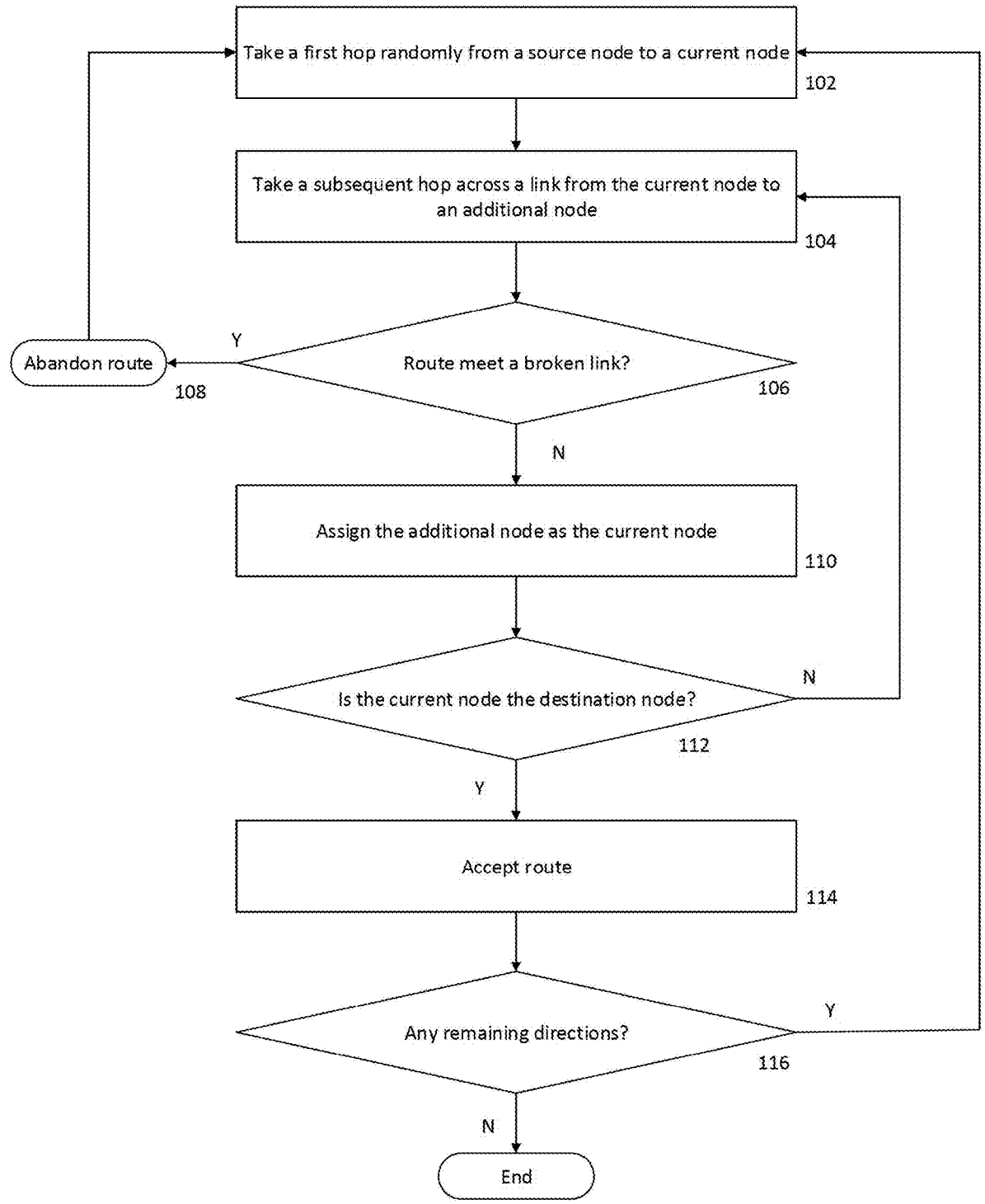
FIG. 1 depicts a flow diagram of an example wild-first hop routing technique according to aspects of the disclosure.

The technology generally relates to an approach for optimizing routing strategy to tolerate faults in a toroidal network topology including, but not limited to, N-dimensional mesh, torus, and twisted torus. The approach may include balancing a load for a specified input traffic pattern operating offline or online. The approach may also include an optimization enhancement technique that leverages the symmetry of the construction of toroidal networks.

A toroidal network may include many possible routes between a source node and a destination node. When calculating global node-to-node routing strategies, candidate routes may be evaluated to determine whether the candidate route includes a broken link. For example, a first candidate route may be determined by identifying a wild-first hop from the source node to a second node, a technique referred to herein as "wild-first routing." The first wild hop may be an arbitrary hop from the source node along any toroidal direction. Subsequent hops are identified using a dimension order to calculate the route between <first-hop, dest>, where dest is the destination node and first_hop is the node selected after a wild-first hop from the source node. A dimension order routing may comprise transferring packets along minimal paths in a first dimension (e.g., x, y, or z) until no further moves are identified in the first dimension and continuing transferring the packet along minimal paths in a second dimension until no dimension is left for traversing. When one of the subsequent hops in a candidate route includes a broken link, the candidate route will be removed from consideration. If the candidate route does not include any broken links between the source node and the destination node, the route may be accepted. A broken link may mean connectivity breakage on a link between two nodes in a network.

According to another example, a different routing calculation strategy may be implemented by identifying a wild-last hop for a candidate route, a technique referred to herein as "wild-last routing." The wild-last hop may be an arbitrary hop along any toroidal direction to reach the destination. Preceding hops may be identified using a dimension order to calculate the route between <src, last_hop>, where src is the source node and last_hop is the node selected after a wild-last hop from the destination node. When one of the preceding hops in a candidate route includes a broken link, the candidate route will be removed from consideration. The route may be accepted if the candidate route does not include any broken links between the destination node and the source node. The above technique may find all acceptable routes. All accepted routes may then be load balanced using a load-balancing algorithm described below to choose one route for each <src, dest>, such that the traffic is globally load-balanced against a predicted traffic pattern.

According to some examples, the wild-first and wild-last routing techniques may be both fault-tolerant and functional for broken links as they may avoid deadlocks in toroidal networks by avoiding cyclic channel dependencies. A deadlock may occur in an interconnection network when some packets cannot advance toward their destination because all of the packets are waiting on one another to release queues. In some other examples, the above routing techniques may be implemented to take multiple wild hops before proceeding with a dimension order to find a route to the destination. For instance, a packet may hop wildly along the Z dimension and then the Y dimension before continuing along an X-Y-Z dimension order. Additional wild hops taken at a beginning node may increase the fault tolerance of the wild-first routing technique by generating more candidate routes that may have disjoint sets of possibly faulty links. For instance, if taking one wild hop is insufficient to avoid faulty links, taking two or more wild hops may provide more candidate routes. In addition, there may be other practical constraints such as a pre-determined dimension order and/or using shortest-path routes where having the ability to take multiple wild hops is beneficial.

The wild-first and wild-last routing techniques may avoid deadlock cycles within a network using an output-queued router architecture. For instance, an output-queued router architecture may include egress queues, ingress queues, and port-to-port queues as separate memory components. Port-to-port queues may buffer data transmitted between ports. Ingress queues may buffer data from the network to other components of the chip, such as register or SRAMS. Egress queues may buffer data produced from other components of the chip to the network. For example, a computing unit may have six ports and the computing unit may be linked to other compute units. While ports in a compute unit transfer packets among the ports within a computing unit via port-to-port queues, the computing unit may transfer the packets to/from other computing units via egress/ingress ports.

Another aspect of the disclosure provides for a load-balancing technique based on integer linear programming to minimize load imbalance across all links and minimize the performance overhead associated with the above routing strategies. The integer linear programming may start with an input traffic pattern. The main variables may include Booleans associated with each candidate route a packet takes through the network. The load on each channel may be computed by summing the Boolean variables for all paths that contain a channel. The optimization technique may be implemented by minimizing the maximum load across all channels in the network.

Another aspect of the disclosure further provides an application of optimizing routing strategies and load-balancing strategies to reconfigurable and scalable toroidal networks. In some examples, a reconfigurable toroidal network computing system may include a distributed cluster with a network fabric composed of toroidal topology shapes, such as 2D/3D torus, and twisted torus. Such a distributed cluster may comprise multiple homogenous subnets building blocks, as an example, each building block can be in a 4×4×4 cubic form. Each 4×4×4 subnet building block may have 32 wires along X/Y/Z dimensions.

It may be possible that hardware faults within the network occur at various places. When hardware faults occur at compute units or interconnect fabric from across subnet building blocks, the faulty links between nodes may be routed around and excluded from dynamic cross-connection for scheduling. In some examples, every switch in the network may spawn a wire connection to every subnet. The compute nodes/subnet and the switches are connected in an "all-to-all" fashion. Every circuit switch may connect to every cube with a limited set of connections. When a circuit switch is down, it may cause every cube to lose one or two links which may create a symmetric fault pattern. This is because the cubes are centrally cross-connected by a set of circuit switches, and each circuit switch is connected to every cube via a subset of each cube's externally facing links In some examples, when a subpart of a circuit switch fails, the connectivity breakage may be regarded as a whole-switch failure event. The failure caused by the centralized switches may occur only along one dimension. The failed links may be repeated for every subnet building block, thereby exhibiting a sparse link breakage pattern suitable for the above optimizing routing techniques.

In some examples, it may be assumed that the input traffic pattern exhibits a symmetric pattern for load balance optimization. A symmetric input traffic pattern may reduce the size of the network to be load balanced in the integer linear programming problem and shorten the above optimization techniques' solution time. In some other examples, for the load-balancing technique to reduce an integer linear programming solution time, the program may reduce the size of the whole toroidal network by considering the joint symmetry of the fault pattern and traffic pattern. For example, a fault pattern may include a pattern where every 4×4×4 cube has one broken link at the same position. A traffic pattern may include a pattern where every node may send the same amount of data to every other node simultaneously such that all links receive the same amount of data.

Figure 2A:
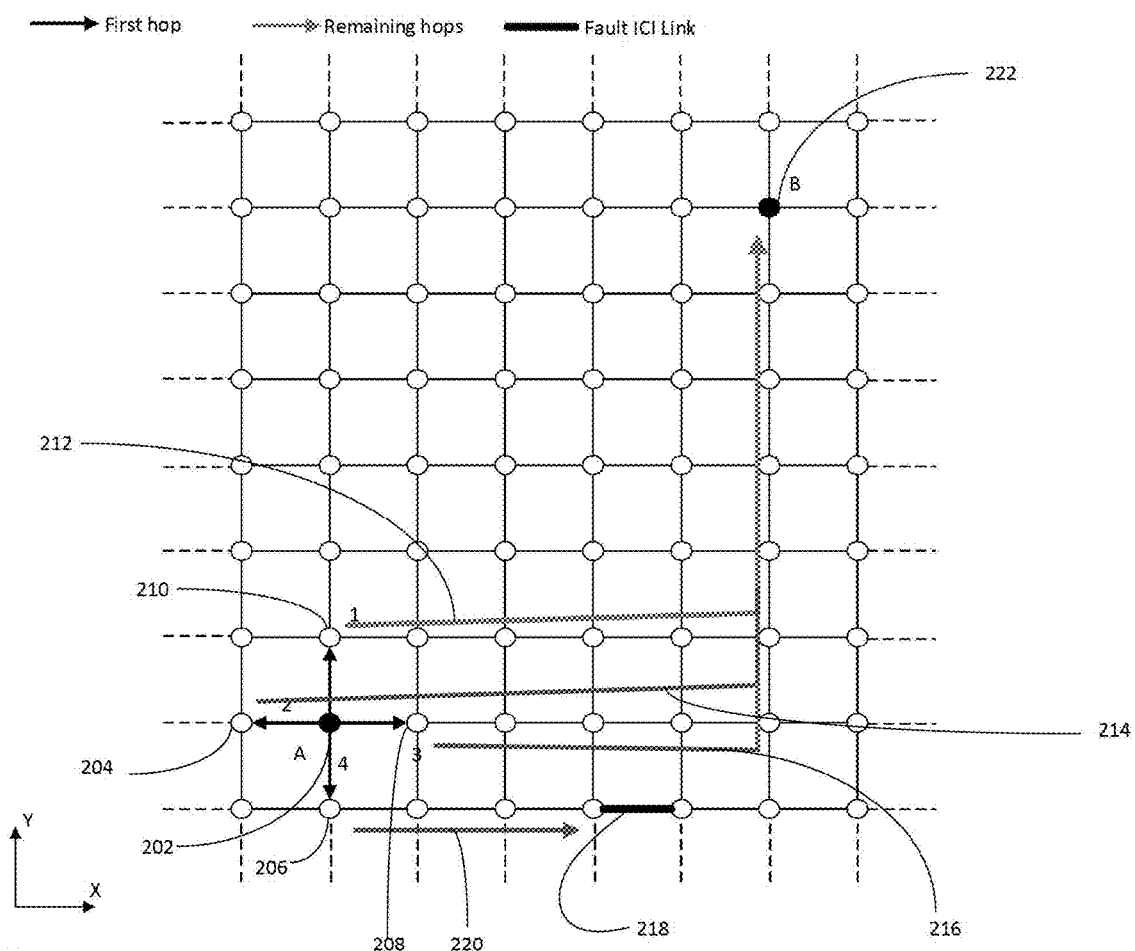
FIG. 2A depicts an example set of candidate routes selected based on the wild-first hop routing technique and the wild-last hop routing technique.

FIG. 1 depicts a flow diagram of an example wild-first hop routing technique. According to block 102, the first hop from a source node to the next node may be arbitrarily selected by sending a packet of data. For example, as illustrated in FIG. 2A, the first hop may be taken from the source node 202 by sending a packet in one of the four directions to the next node such as nodes 204, 206, 208, and 210. For example, source node 202 may send a packet to either node 204 in the x-negative direction, node 206 in the y-negative direction, node 210 in the y-positive direction or node 208 in the x-positive direction. In some examples, the network may include N-dimensions and the first hop may be taken in N×2 directions. For example, in a 3-dimensional environment, the first hop from node 202 may send a packet in six different directions. The next node may be designated as a current node once the packet reaches the next node.

According to block 104, a subsequent hop across a link from the current node to an additional node may be taken. In one example, the hop taken from the current node to an additional node may follow the same dimension order. For example, if a dimension order is X-Y-Z, then the packet may traverse to the next node along the x-dimension first. As illustrated in FIG. 2A, if an arbitrary hop was taken and the packet reached node 208 in the x-positive direction, the next hop from node 208 may follow the same x-positive direction until no further moves in the x-positive direction may constitute a minimal path to the destination node 222 without changing to a second direction such as a y-positive direction.

According to block 106, if the hop from the current node to an additional node encounters a broken link, then the route comprising all preceding hops may be removed at block 108. A broken link may include any type of connectivity breakage on a link between two nodes. If the hop from the current node to an additional node does not encounter a broken link, the packet may continue to traverse to the next node following the same dimension order. Once the packet reaches the next node without encountering a broken link, the next node may be designed as a current node. If the route comprising all preceding hops is removed because the last hop encountered a broken link, then another first hop may be taken from a source node along a different direction. For example, as illustrated in FIG. 2A, if node 206 was reached by a packet previously, a packet may be sent from node 202 to one of the other nodes in other directions, such as node 204 in the x-negative direction, node 210 in the y-positive direction, or node 206 in the y-negative direction.

According to block 112, if the current node is not the destination node, then the next hop may be taken by sending the packet to the next node in the same direction. The steps may be repeated until the packet reaches the destination node without encountering a broken link. If the packet reaches the destination node, then the route comprising all the preceding hops is accepted as a valid route according to block 114. A valid route may be a route from a source node to a destination node without any broken link along a dimension order.

According to block 116, if there is any other direction that a hop can follow at the source node, another first hop may be taken at the source node 202 and repeat the above steps from block 102 to block 116.

Figure 2B:
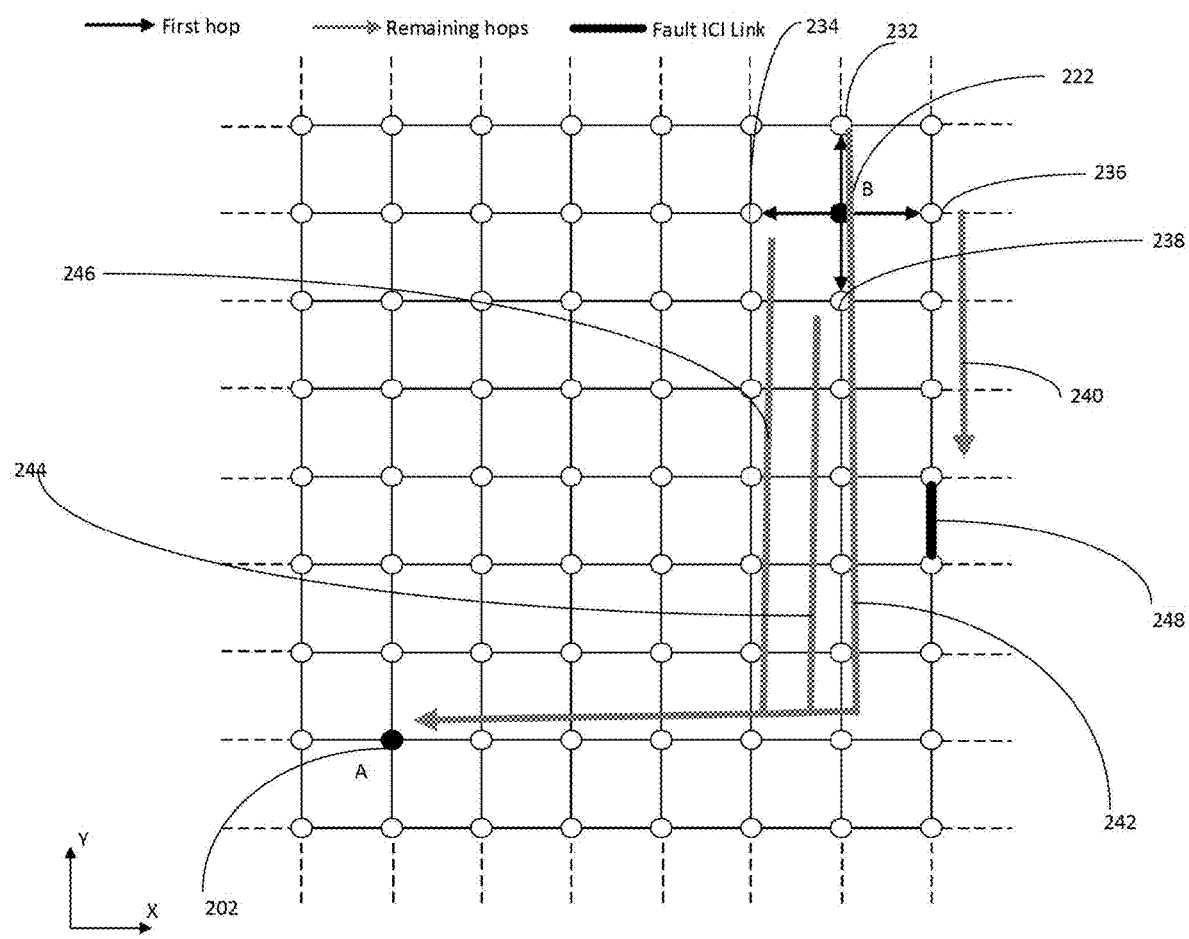
FIG. 2B depicts an example set of candidate routes selected based on the wild-last hop routing technique.

FIG. 2A-2B depicts a block diagram of an example set of candidate routes selected based on the wild-first hop routing technique and the wild-last hop routing technique. Referring to FIG. 2A, Node 202 may be a source node and node 22 may be a destination node. At node 202, a candidate route can be established by taking a first arbitrary hop to either node 210 in the y-positive direction, node 206 in the y-negative direction, node 208 in the x-positive direction, and 204 in the x-negative direction. In this example, the second hop may follow the x-y dimension order. For example, if a packet from source node 202 reaches node 208, the subsequent hops must follow the same x-positive direction until no shortest path may be created in the x-positive direction. Similarly, if the packet reaches node 210, route 212 may be generated following the same x-y dimension order. If the packet reaches node 204, the next hop may be taken from source node 202 to node 208. Route 214 may be generated following the same x-y dimension order. However, when taking the first hop to reach node 206 in the y-negative direction, route 220 may encounter a broken link 218. In such a case, route 220 may be removed.

Figure 3:
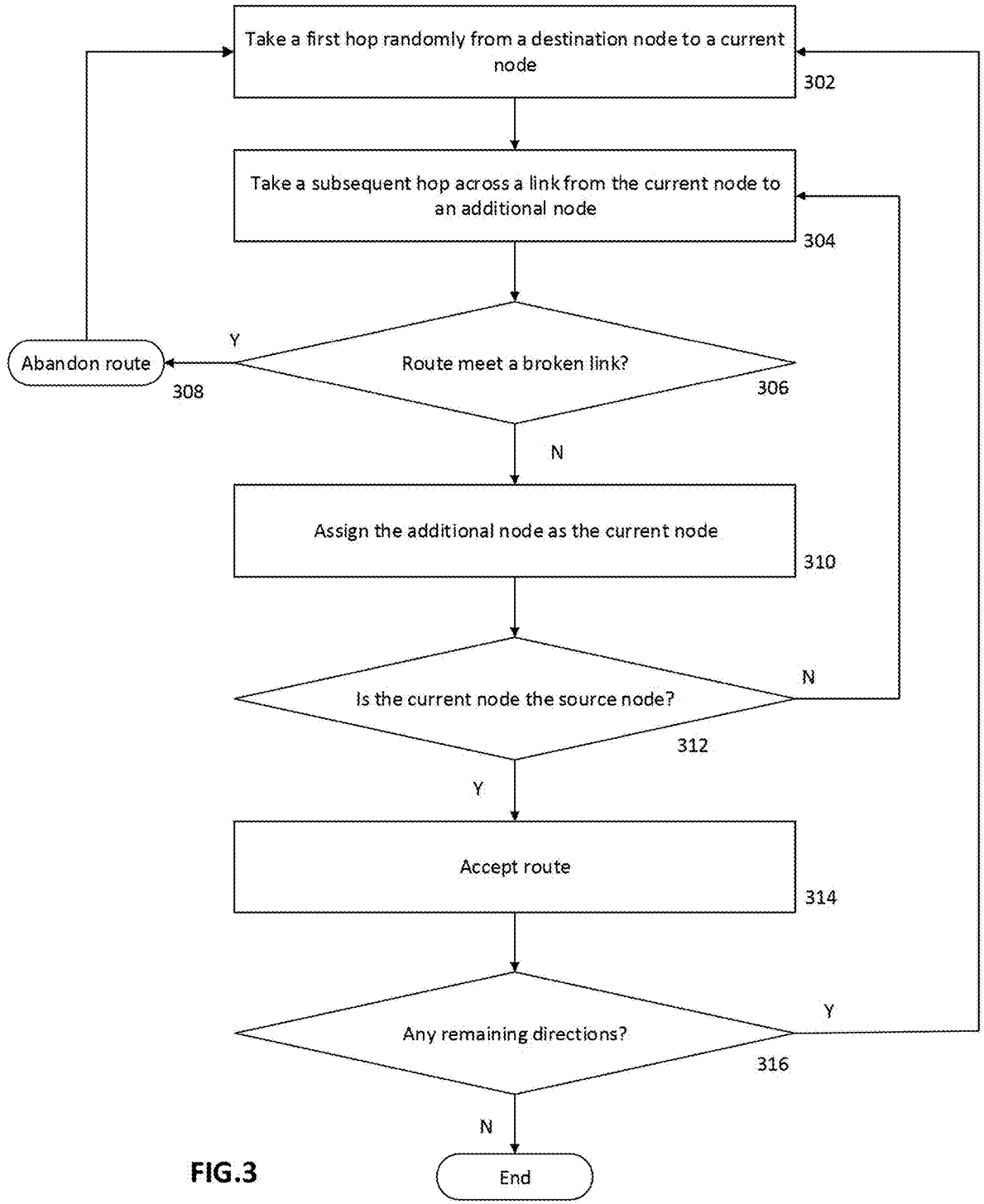
FIG. 3 depicts a flow diagram of an example wild-last hop routing technique according to aspects of the disclosure

Referring now to FIG. 2B, a first hop may be arbitrarily taken from the destination node 222. Node 222 may send a packet to either node 236 in the x-positive direction, node 238 in the y-negative direction, node 234 in the x-negative direction, or node 232 in the y-positive direction. In this example routes 240, 242, 244, and 246 may be generated by following the y-x dimension order. In another example, routes may be generated by following the x-y dimension order. For example, node 222 may send a packet to node 234, and node 234 sends the packet to the next node in the x-negative direction. However, if route 240 encounters a broken link 248, route 240 may be removed from further consideration. In this example, routes 242, 244, and 246 may be accepted as successful candidate routes FIG. 3 depicts a flow diagram of an example wild-last hop routing technique. According to block 302, the first arbitrary hop may be taken from the destination node. The destination node may then send a packet to a current node following the same dimension order such as the x-y dimension order or the y-x dimension order.

According to block 304, another hop may be taken from the current node by sending a packet to an additional node following the same dimension order.

According to block 306, when the packet is sent to the additional node, the packet may or may not encounter a broken link such as broken link 248 as illustrated in FIG. 2B. If the packet encounters such a link, the route comprising all preceding hops may proceed to block 308 and be removed from further consideration. Once the route is removed, another first hop may be selected at the destination node at block 302 and repeat the above steps until the new route does not encounter a broken link. When the route does not encounter a broken link, the additional node may be designated as a new current node according to block 310.

According to block 312, if the new current node is the source node, then the route comprising all the preceding hops may be accepted as a successful candidate route at block 314. If the current node is not the source node, then the above steps may be repeated by proceeding back to block 304.

According to block 316, if there is any remaining direction not selected at the destination node, the above steps may be repeated by proceeding back to block 302. At block 302, another first hop may be selected and send a packet in a different direction. According to some examples, the above steps may repeat until all the possible first hops in all directions are selected.

According to some examples, each successful candidate route may be utilized by the load-balancing strategy discussed below to find a single optimization route for each source and destination node pair. The single optimization route for each source and destination node pair may be stored in a table in memory for subsequent routing of data between the source and destination node pair. The load-balancing strategy is described in more detail with respect to FIG. 5 below.

Figure 4:
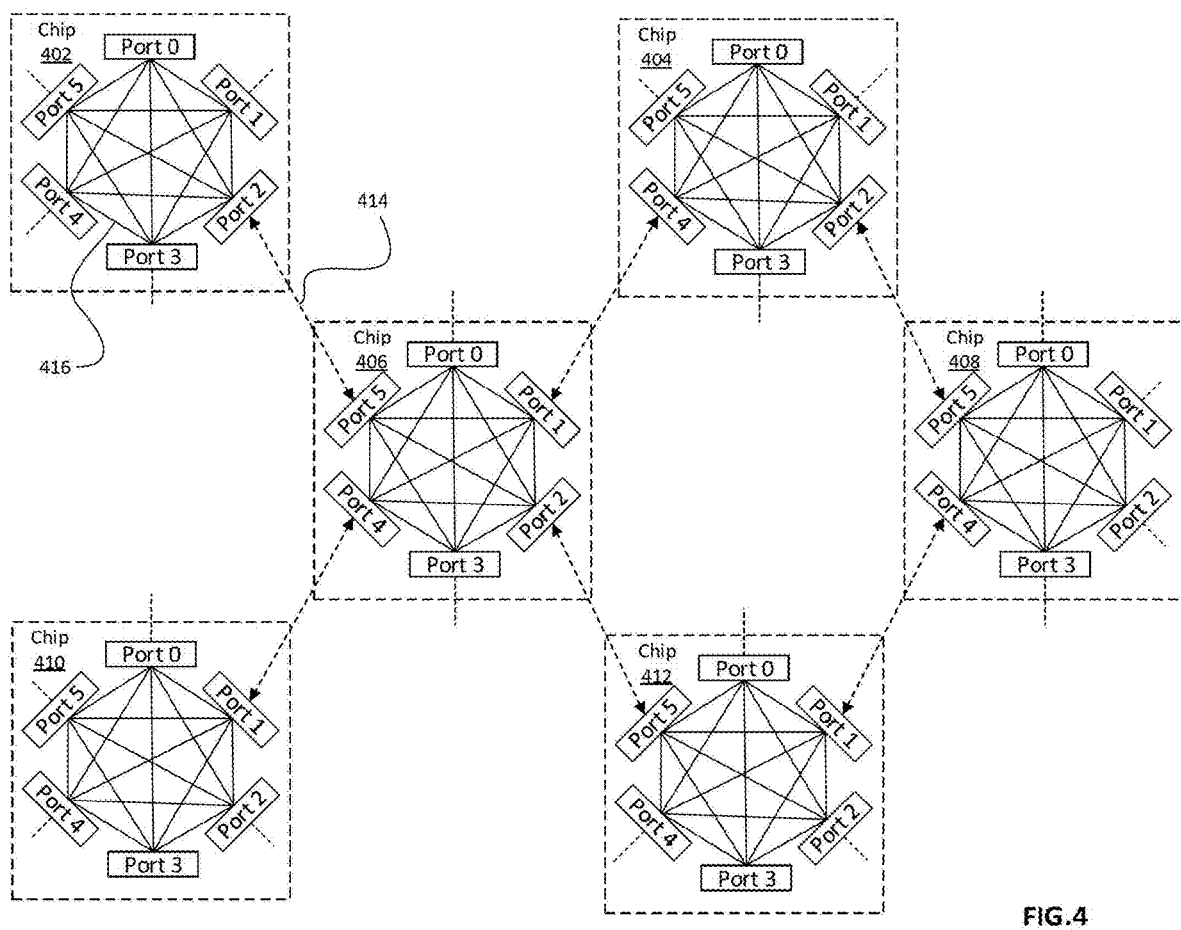
FIG. 4 depicts a block diagram of an example set of compute units connected via queues according to aspects of the disclosure.

FIG. 4 depicts a block diagram of an example set of compute units connected via port-to-port queues. Each chip 402, 404, 406, 408, 410, and 412 may have 6 ports for 3D +ve and −ve communication. Each port within each chip may have 5 port-port queues set up at the output side of the port, such as queue 416. There may be 6 output queues sourcing from each chip and 6 input queues sinking at each chip. For example, queue 414 may act as an egress queue if data is coming toward port 5 of chip 406. Queue 414 may act as an ingress queue when port 5 of chip 406 sends data to port 2 of chip 402.

According to some examples, a router may be located on the same (or different) die with compute units and may contain queues (e.g., egress queues, ingress queues, and/or port-to-port queues), and a content-addressable memory that stores routing rules. An addressable memory may store a routing map for defining how packets are routed hop-by-hop between source and destination node pairs. The port-to-port queues may buffer data coming in from an input port to an output port and may serve as the relay of an intermediate hop to send data to a destination. The port-to-port queues may be set at the input port or the output port. The decision of which queue data may be buffered to go to the output may be determined by consulting the content-addressable memory. The wild-first routing technique and the wild-last routing technique may leverage the above-described queue structures to eliminate deadlock cycles.

Figure 5:
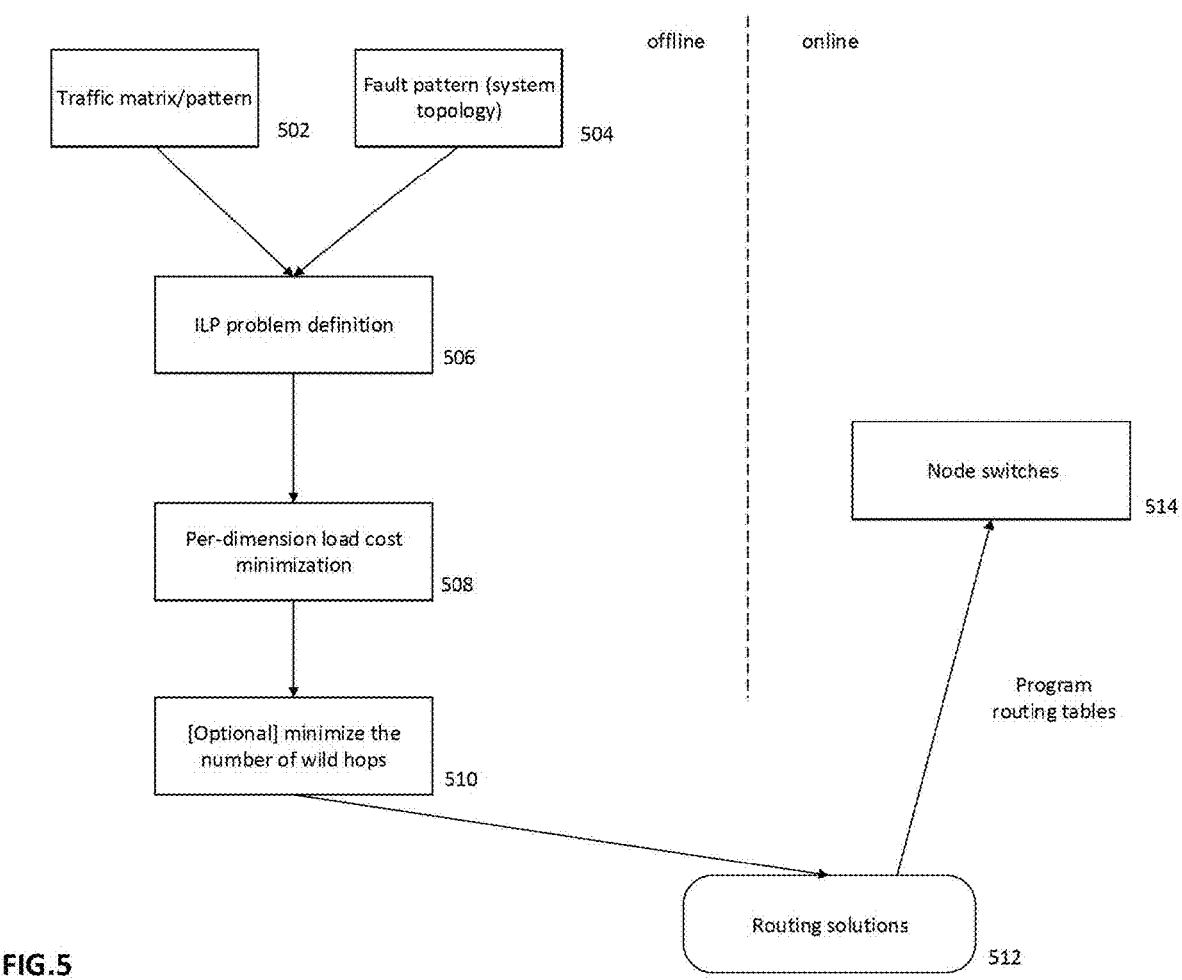
FIG. 5 depicts a flow diagram of an example load-balancing strategy according to aspects of the disclosure.

FIG. 5 depicts a flow diagram of an example load-balancing strategy that minimizes load imbalance across links of a network. According to block 502, routers may receive information on a traffic matrix or a traffic pattern of the network. If there is a large traffic load over a particular link, relative to other links, the large traffic load may be reduced to improve the performance of the network. In this regard, large traffic loads over a link may cause a traffic imbalance over the network and reduce the performance of data transfer over the network.

According to block 504, a fault pattern based on a type of network topology may be determined. A fault pattern may include a pattern that can be observed in each subnet cube of the building blocks within a large cluster of the building blocks. For example, in a cluster of building blocks with 4×4×4 cubes, every 4×4×4 cube may lose one link at the same position such as an x-positive direction at location (0,3,4) if a circuit switch connected to every cube is down.

According to block 506, an integer linear programming (ILP) problem may be implemented by first defining certain variables. The main variable may be Booleans associated with each possible route a packet may traverse through the network. The load on each link or channel may be defined as Y and computed by summing the variables (x) for each route that contains a link or a channel (c). An integer linear programming formula is as follows:

Formula 1:

$$\gamma_C = \sum_{p \in c} x_p$$

According to block 508, load across all links in each dimension may be minimized using the following formula:

Minimize L,s·t $\gamma_C \leq L_{dim(c)}, \forall c$ $L_d \leq L, \forall d$   Formula 2:

$L_d$ may be the maximum load on dimension d. Once the minimum value for the Load (L) is determined, it may be determined that at least one dimension needs to have its load equal to the minimum. According to some other examples, the remaining dimensions' loads may be further reduced by progressively isolating dimensions following a dimension order and resolving the above formula. For example, if X is the first dimension, the above "$L_d \leq L$" constraint may be replaced with "$L_x \leq L_{min}$" and the optimization may be performed again. This process may continue until all dimensions are isolated.

According to block 510, the total number of wild hops taken from either a source node or a destination node may be minimized by changing the optimization objective in the above formulas. In one example, the objective may be the sum of the $x_p$ variables associated with wild-hop routes.

According to block 512, the system may resolve a high-traffic routing problem by either taking the dimension with the minimum load on links or selecting the route with the minimum number of wild hops taken at each link.

According to block 514, the resolved high-traffic routing may be stored in one or more tables. The tables may then be sent to all nodes in the networks to balance the loads across all links in the network.

Figure 6:
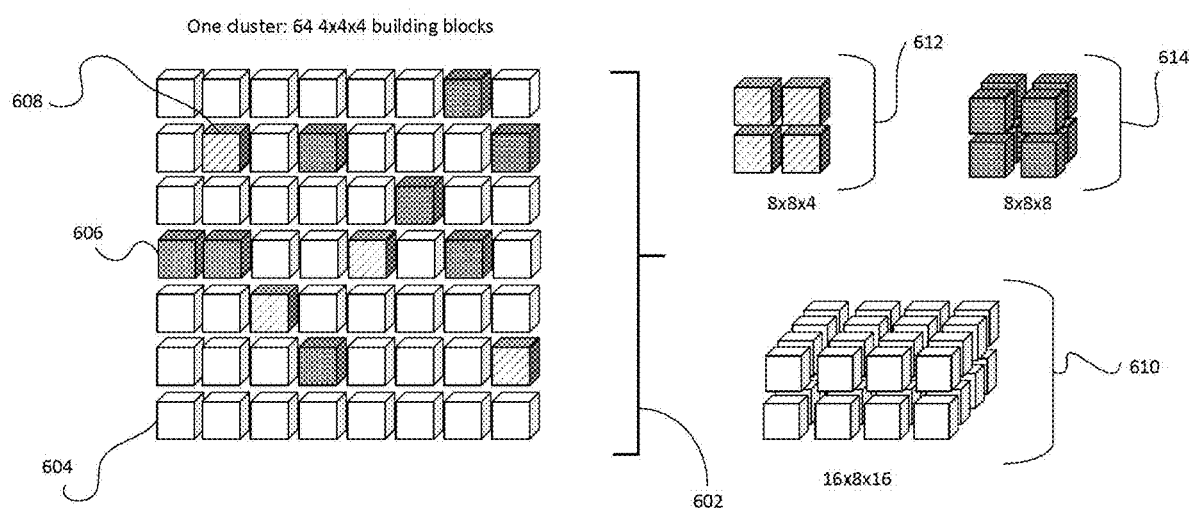
FIG. 6 depicts a block diagram of an example cluster of compute units according to aspects of the disclosure.

FIG. 6 depicts a block diagram of an example cluster of compute units. The cluster may be a distributed cluster with a network fabric composed of toroidal topology shapes. The network fabric may be scalable because the entire cluster may be built upon a homogenous small subnet building block, such as 4×4×4 fix-wired cubes. Each subnet building block may produce external-facing wires that can be paired.

The circuit switch can be of any technology and make use of any medium. The circuit switch may be an optical circuit switch. The network fabric may be a CPU-side network or an accelerator-side network.

As illustrated in FIG. 6, a cluster 602 comprising 64 subnet building blocks (circuit switches omitted) is illustrated. Each subnet building block comprises 64 compute units arranged into 4×4×4 3D cubical shapes The cubes may be centrally cross-connected by a set of circuit switches. Circuit switches may select various sets of subnet buildings. For example, different jobs may be selected using each subnet building block such as building blocks 604, 606, and 608. Building block 608 may be rearranged into larger units of jobs 612. Building block 606 may be rearranged to 8×8×8 building block 614 and building block 604 may be grouped into a larger 16×8×16 building block 610.

A fault may occur at the same spot on each subnet building block, thereby showing symmetries in larger building blocks. Such symmetries may be leveraged to simplify the above-described load-balancing strategies. Various patterns of the aforementioned symmetries are illustrated in FIGS. 7-11.

Figure 7:
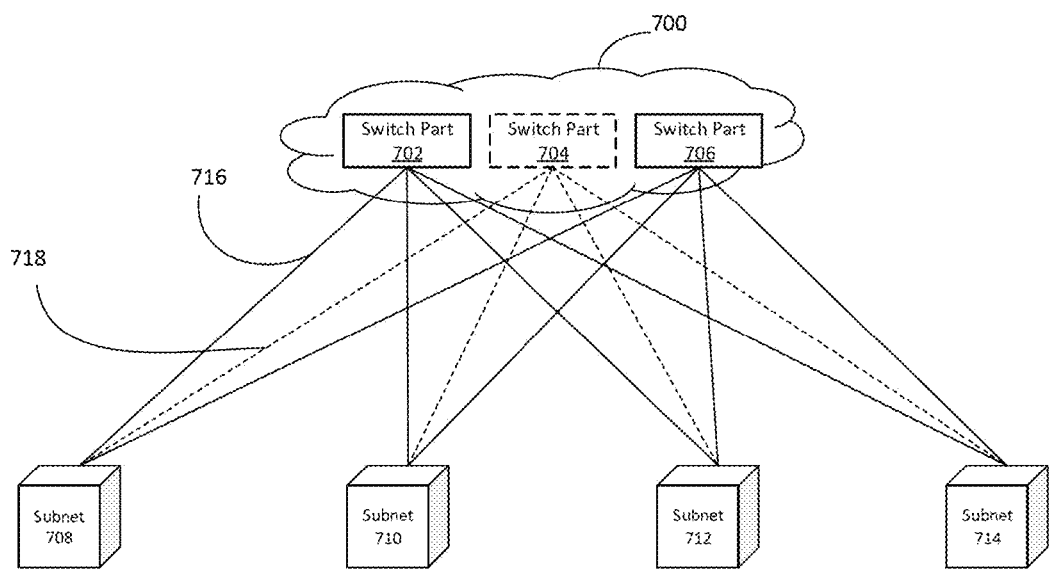
FIG. 7 depicts a block diagram of an example of connectivity between circuit switches and compute subnet units according to aspects of the disclosure.

FIG. 7 depicts a block diagram of an example of connectivity between circuit switches and compute subnet units. Hardware faults can occur for the compute units and interconnect fabric from within a subnet building block. Hardware faults may also occur at the centralized circuit switches that may interconnect different subnets.

Figure 8:
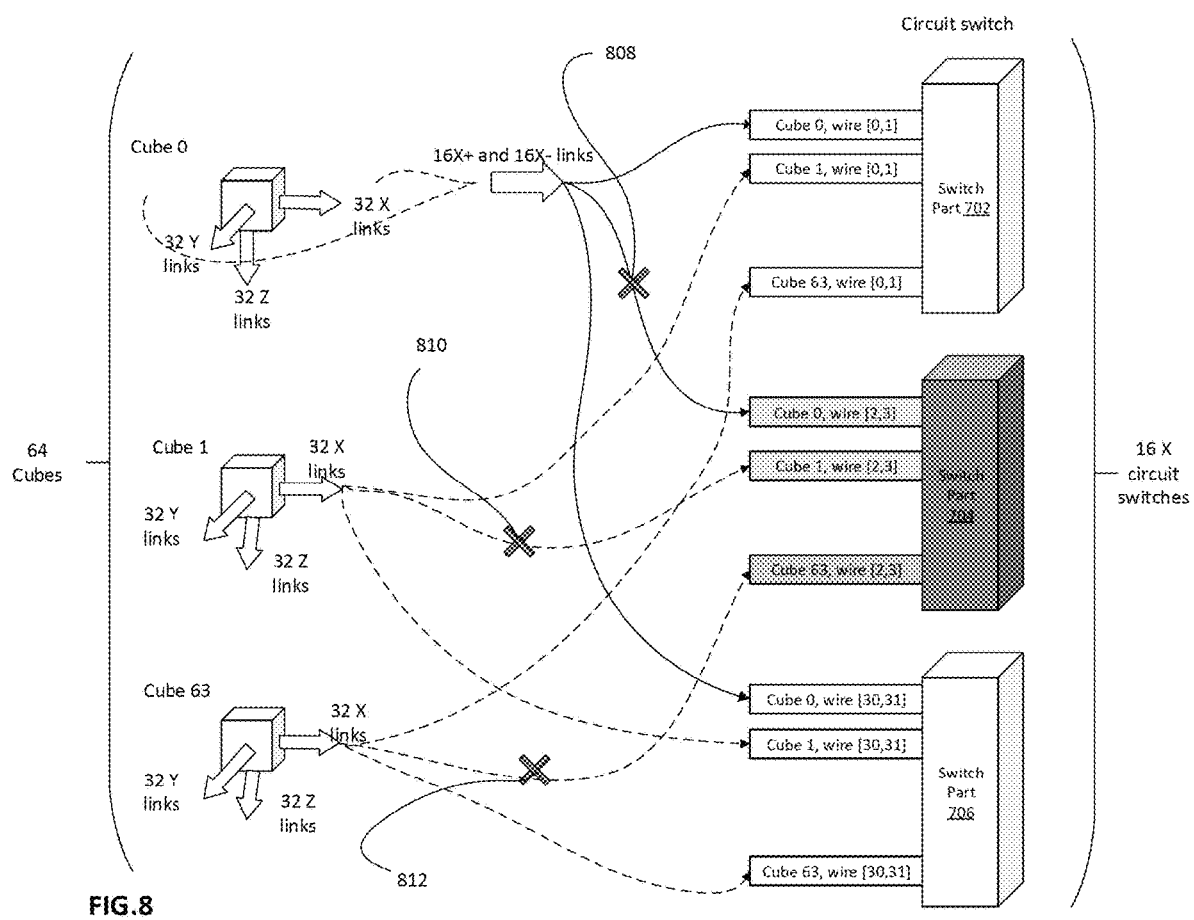
FIG. 8 depicts a block diagram of an example connectivity breakdown in a 3D toroidal cluster when a circuit switch fails according to aspects of the disclosure.

Network 700 includes circuit switch 702, circuit switch 704, and circuit switch 706. Subnet 708 may be connected to circuit switches 702, 704, and 706. Each subnet is connected to the circuit switch in an "all-to-all" fashion. When a fault occurs at circuit switch 704, for example, and although subnet 708 may lose a link 718, subnet 708 may still maintain connectivity with subnets 710, 712, and 714. Thus, if the circuit switch set has a sufficient number of switches to ensure all the subnet building blocks in a cluster are connected to each other, the network can provide a fault pattern that may be consistently observed throughout each subnet or building block of a cluster FIG. 8 depicts a block diagram of an example connectivity breakdown in a 3D toroidal cluster when a circuit switch fails. FIG. 8 illustrates the same switch fault as illustrated in FIG. 7. If circuit switch 704 breaks down, the broken switch may have a large impact on the entire cluster network. The impacted radius may be large when the number of circuit switches scales with the size of the network.

In this example, each subnet building block may process 32 wires along x/y/z dimensions. Each circuit switch may have the capacity for 128 wires. When a switch fails, as all the subnet blocks may be connected to circuit switch 704, a broken wire may affect at least some position within each subnet building block. For example, link 808 may be affected by part 704. Link 810 and 812 may also be affected. In this example, each cube may have the same fault pattern since each cube 0, cube 1 and cube 2 are connected to circuit switch 704 from the nodes located at the same position within the cube. In this example, they are connected by the nodes in the position [2,3].

Figures 9A, 9B:
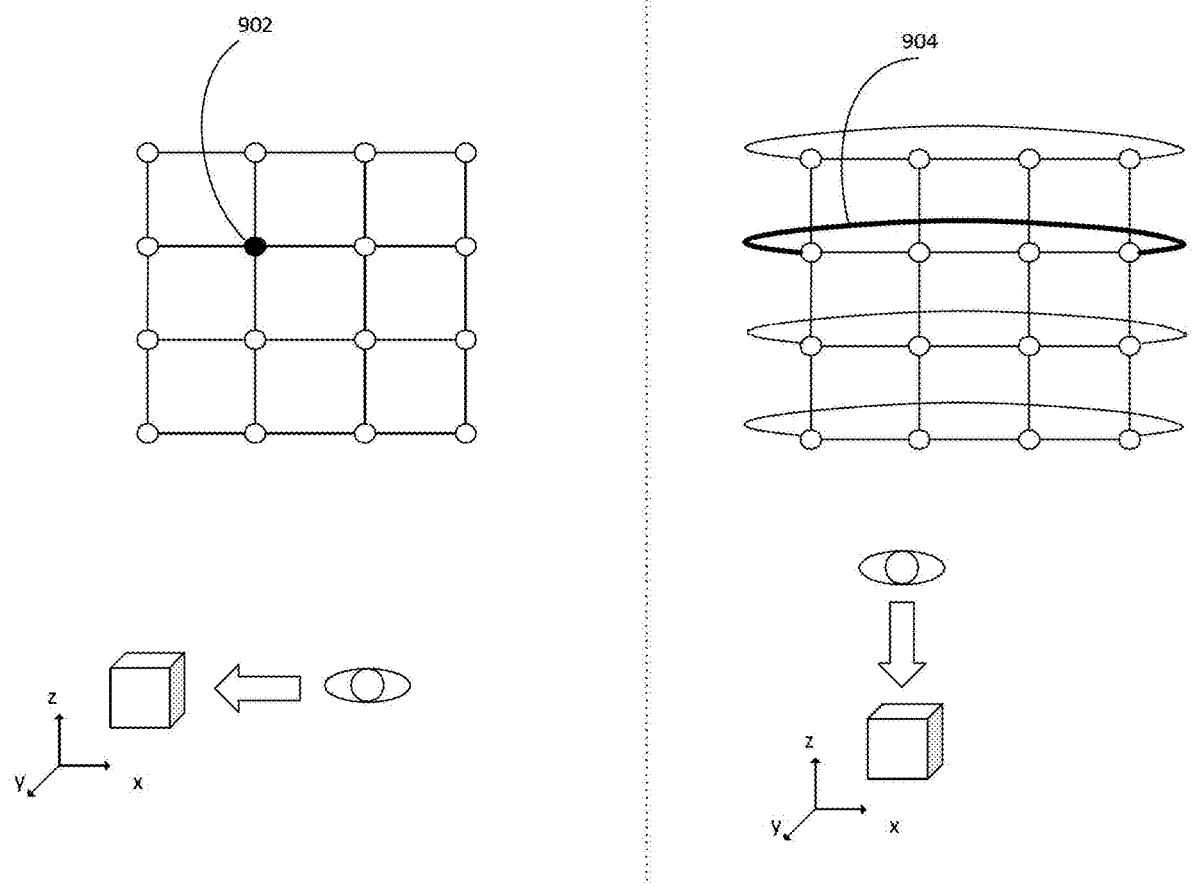
FIGS. 9A and 9B illustrate example planar views of a 4×4×4 torus when a circuit switch is down in x dimension according to aspects of the disclosure.

FIG. 9A-9B depicts a block diagram of an example planar view of a 4×4×4 torus when a circuit switch is down in the x dimension. Broken link/channels may be shown as a dot (node 902) in the y-z plane view. Ring 904 shows that it may show as a ring when a switch in the x dimension is down when viewed in the x-y plane.

Figure 10A:
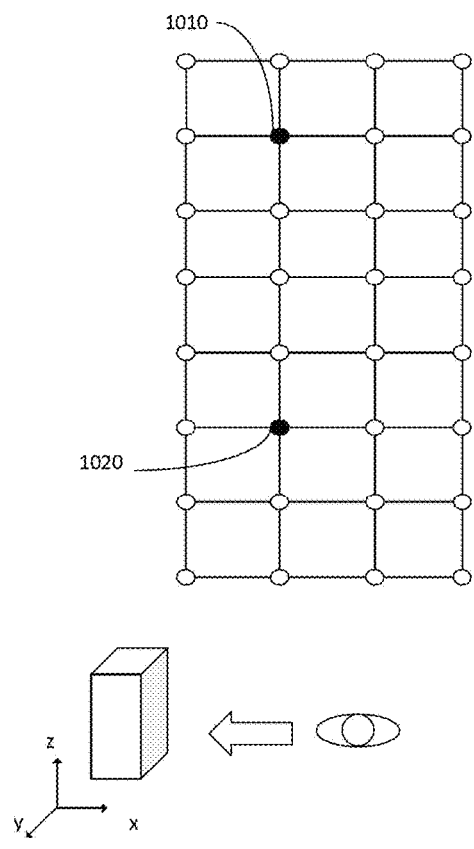
FIGS. 10A and 10B illustrate example planar views of a 4×4×8 torus when a circuit switch is down in x dimension according to aspects of the disclosure.
Figure 10B:
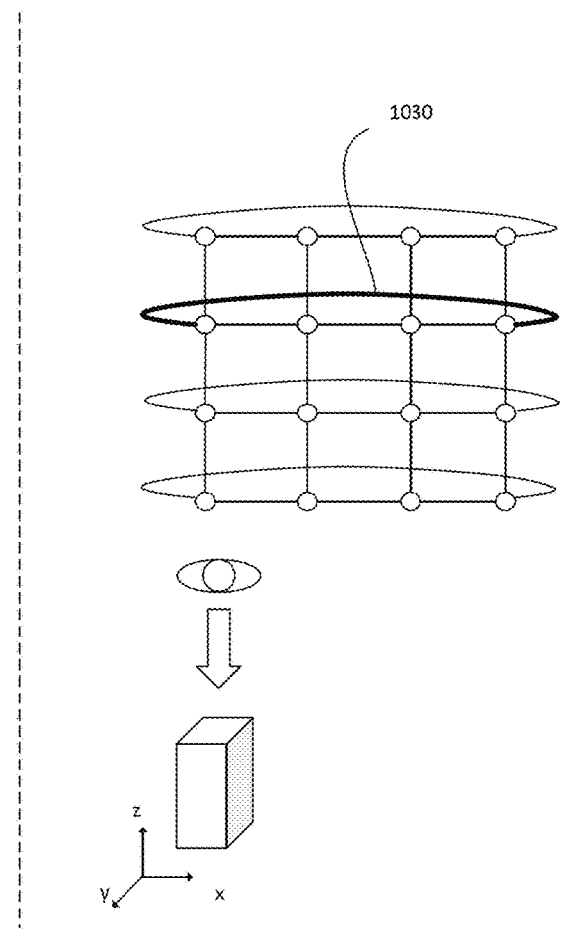
Figure 10C:
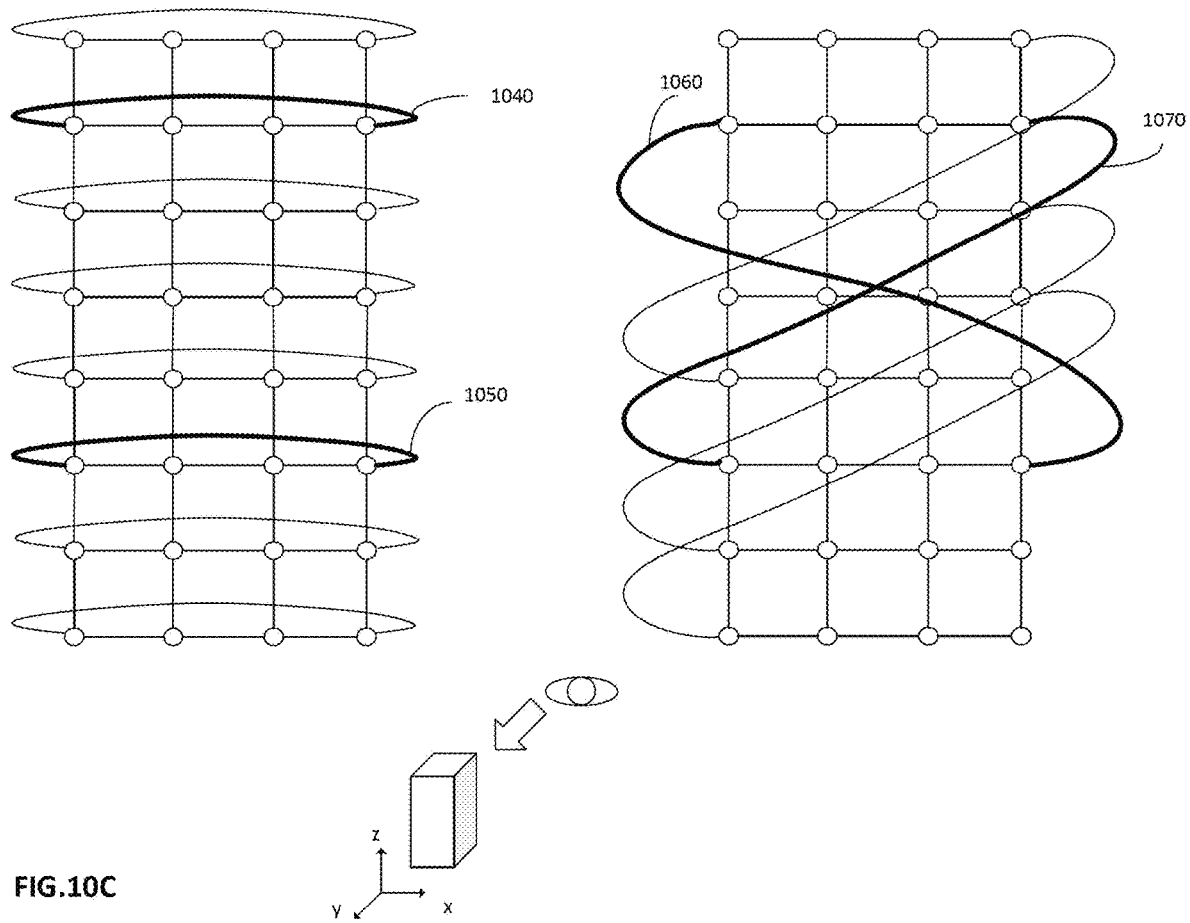
FIG. 10C illustrates example perspective views of a 4×4×8 torus when a circuit switch is down in x dimension according to aspects of the disclosure.

FIGS. 10A and 10B illustrate example planar views of a 4×4×8 torus when a circuit switch is down in x dimension. FIG. 10C illustrates example perspective views of a 4×4×8 torus when a circuit switch is down in x dimension. When two circuit switches in the x dimension are down, nodes, node 1010 and 1020 may be seen as dots in the y-z plane view. When two broken x-dimension circuit switches are down, a ring 1030 can be overserved in the x-y plane view. When two circuit breakers are down in the x dimension, the broken links may be shown as the broken links 1040, and 1045 may be shown as two rings in the torus. In twisted tori, the broken links 1060 and 1070 may be shown as one big ring.

FIGS. 11A and 11B illustrate example planar views of a 4×4×8 torus when a circuit switch is down in z dimension. FIG. 11C illustrates an example perspective view of a 4×4×8 torus when a circuit switch is down in z dimension according to aspects of the disclosure.

There are two circuit switches down in the z dimension, and the broken link 1100 may show as a and link 1120 as a line in the y-z plane view. There is one circuit switch down in the z dimension, and the broken link 1130 may show as a dot in the x-y plane view.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. Method for optimizing routing for a network, the method comprising:
   (i) taking, by one or more processors, a first hop arbitrarily from a source node to a current node along any direction, the first hop establishing a candidate route;
   (ii) taking, by the one or more processors, a subsequent hop across a link from the current node to an additional node following a dimension order;
   (iii) assigning, by the one or more processors, the additional node as the current node and repeating steps (ii)-(iii) until the current node is a destination node; and
   (iv) taking, by the one or more processors, a new first hop from the source node along a new direction to establish a new candidate route and repeating steps (ii)-(iv) until candidate routes are established for all directions from the source node,
   further comprising load-balancing each link within the network using integer linear programming, and further comprising:
   determining the load balance of each link using the following formula:

$$\gamma_C = \sum_{p \in c} x_p$$

wherein, $\gamma_C$ is the load on each link c, p is a candidate route, and x is a Boolean variable that determines whether the candidate route passing the link c is selected by the integer linear programming.

2. The method of claim 1, further comprising:
   minimizing a maximum load across all channels using the following optimization formula:

Minimize L, s·t $\gamma_C \leq L_{dim(c)}, \forall c$ $L_d \leq L, \forall d$ wherein L is the maximum load across all dimensions, $L_{dim(c)}$ is a maximum load across all link c on a dimension, and $L_d$ is a maximum load on dimension d.

3. The method of claim 2, further comprising:
   reducing a number of the channels by taking a multiplier between a fault pattern and a traffic pattern of the network.

4. A routing system of optimizing routing for a network comprises:
   a network fabric;
   a plurality of circuit switches; and
   a plurality of compute nodes, each compute node comprising one or more processors and memory storing instructions that, when performed by the one or more processors, causes the one or more processors to perform operations, the operations comprising:
   (i) taking a first hop arbitrarily from either a source node to a current node along any direction, the first hop establishing a candidate route;
   (ii) taking a subsequent hop across a link from the current node to an additional node following a dimension order;
   (iii) assigning the additional node as the current node and repeating steps (ii)-(iii) until the current node is the destination node; and
   (iv) taking a new first hop from the source node along a new direction to establish a new candidate route and repeating steps (ii)-(iv) until candidate routes are established for all directions from the source node,
   wherein the operation further comprises load-balancing each link within the network using integer linear programming, and wherein the operation further comprises:
   determining the load balance of each link using the following formula:

$$\gamma_C = \sum_{p \in c} x_p$$

wherein, $\gamma_C$ is the load on each link c, p is a candidate route, and x is a Boolean variable that determines whether the candidate route passing the link c is selected by the integer linear programming.

5. The system of claim 4, wherein the operation further comprises: minimizing a maximum load across all channels using the following optimization formula:

Minimize L, s·t $\gamma_C \leq L_{dim(c)}, \forall c$ $L_d \leq L, \forall d$ wherein L is the maximum load across all dimensions, $L_{dim(c)}$ is a maximum load across all link c on a dimension, and $L_d$ is a maximum load on dimension d.

6. The system of claim 5, wherein the operation further comprises:
   reducing a number of the channels by taking a multiplier between a fault pattern and a traffic pattern of the network.

* * * * *